United States Patent [19]

Coste et al.

[11] Patent Number: 4,750,591

[45] Date of Patent: Jun. 14, 1988

[54] ELEVATOR CAR DOOR AND MOTION SEQUENCE MONITORING APPARATUS AND METHOD

[75] Inventors: Steven D. Coste, Berlin; Gregory A. Schienda, Southington, both of Conn.

[73] Assignee: Otis Elevator Company, Farmington, Conn.

[21] Appl. No.: 72,818

[22] Filed: Jul. 10, 1987

[51] Int. Cl.⁴ .............................................. B66B 3/00
[52] U.S. Cl. ................................. 187/130; 187/133
[58] Field of Search ................ 187/101, 130, 133; 340/506

[56] References Cited

U.S. PATENT DOCUMENTS

| 4,367,810 | 1/1983 | Doane et al. | 187/101 X |
| 4,418,795 | 12/1983 | Trosky et al. | 187/130 |
| 4,512,442 | 4/1985 | Moore et al. | 187/133 |
| 4,568,909 | 2/1986 | Whynacht | 187/133 |
| 4,622,538 | 11/1986 | Whynacht et al. | 340/506 |
| 4,681,190 | 7/1987 | Toshiaki | 187/101 |
| 4,698,780 | 10/1987 | Mandel et al. | 187/130 X |

FOREIGN PATENT DOCUMENTS 54-15250 2/1979 Japan ..................... 187/130

Primary Examiner—William M. Shoop, Jr.
Assistant Examiner—W. E. Duncanson, Jr.
Attorney, Agent, or Firm—Francis J. Maguire, Jr.

[57] ABSTRACT

An elevator monitoring apparatus and method are disclosed in which an elevator is modeled as operating in a closed loop chain of normal operating states from which message initiating transitions to abnormal states causes the latest to occur of a selected number of monitored events are recovered from a storage buffer as an aid to an analysis of an abnormal state. Door and motion closed loop chain state machines are disclosed as effective tools for abnormal event detection, especially for a state machine approach implemented within an elevator controller.

5 Claims, 8 Drawing Sheets

FRONT DOOR SEQUENCE OF EVENTS TRANSITION TABLE

| EVT# S | 45 NMODE on | 46 NMODE off | 1 DO on | 83 F15 on | 3 DC on | 4 F8 on | 51 DFC on | 7 DFC off | 8 DFO on | 5 NDG on | 13 F6 on | 75 F11 on | 0 POF on | 81 F12 on |
|---|---|---|---|---|---|---|---|---|---|---|---|---|---|---|
| 0 | D | S6/009 | S1/016 | D | D | D | D | S5/014 | S5/012 | D | D | D | S9 | D |
| 1 | D | S6/009 | D | S5/013 | D | D | D | S2 | S5/012 | D | S8/021 | D | D | D |
| 2 | D | S6/009 | D | S5/013 | D | D | S1 | D | S3/017 | D | S8/021 | D | D | D |
| 3 | D | S6/009 | D | D | S4/018 | D | D | S5/012 | D | S4/020 | D | D | D | D |
| 4 | D | S6/009 | S4/015 | D | S4/018 | D | D | D | D | S4/020 | S8/021 | D | D | S0/019 |
| 5 | D | S6/009 | D | D | D | S0 | D | D | D | D | S8/021 | D | D | D |
| 6 | S7 | D | D | D | D | D | D | D | D | D | D | D | D | D |
| 7 | D | S6/009 | D | D | D | S0 | D | D | D | D | D | D | D | D |
| 8 | D | S6/009 | D | D | D | S0/003 | D | D | D | D | D | D | D | D |
| 9 | D | D | D | D | D | D | D | D | D | D | D | S0 | D | D |

FIG. 4(b)

MOTION SEQUENCE OF EVENTS TRANSITION TABLE

| EVT# / S | 54 RUNUP on | 74 RUN off | 55 RUNDN on | 56 LLU on | 57 LLU off | 58 LLD on | 59 LLD off | 61 UMV off | 63 DMV off | 64 ULI on | 65 ULI off | 68 DZI on | 69 DZI off |
|---|---|---|---|---|---|---|---|---|---|---|---|---|---|
|  | S1/001 | D | S6/001 | S11/004 | D | S12/004 | D | D | D | D | D | D | D |
| 1 | D | S13/006 | D | D | D | D | D | S2/008 | D | D | D | D | D |
| 2 | D | S13/006 | D | D | D | D | D | D | D | S3/022 | D | D | D |
| 3 | D | S13/006 | D | D | D | D | D | D | D | D | S13/010 | S4/022 | D |
| 4 | D | S13/006 | D | D | D | D | D | D | D | S5/022 | D | D | S13/010 |
| 5 | D | S0/011 | D | D | D | D | D | D | D | S13/010 | D | D | S13/010 |
| 6 | D | S13/006 | D | D | D | D | D | D | S7/008 | S6/039 | D | D | D |
| 7 | D | S13/006 | D | D | D | D | D | D | D | S13/010 | D | D | D |
| 8 | D | S13/006 | D | D | D | D | D | D | D | S13/010 | D | S9/022 | D |
| 9 | D | S13/006 | D | D | D | D | D | D | D | S13/010 | D | D | S13/010 |
| 10 | D | S0/011 | D | D | D | D | D | D | D | S13/010 | D | D | S13/010 |
| 11 | D | D | D | D | S0/038 | D | D | D | D | D | D | S11/022 | D |
| 12 | D | D | D | D | D | D | S0/038 | D | D | D | D | S12/022 | D |
| 13 | D | D | D | D | D | D | D | D | D | D | D | D | D |
| 14 | D | D | D | D | D | D | D | D | D | D | D | D | D |
| 15 | D | D | D | D | D | D | D | D | D | D | D | D | D |
| 16 | D | D | D | D | D | D | D | D | D | D | D | D | D |

FIG. 5(b)

MOTION SEQUENCE OF EVENTS TRANSITION TABLE (CON'T)

| EVT # | 66 | 67 | 42 | 43 | 44 | 46 | 45 | 47 | O | 75 | 48 |
|---|---|---|---|---|---|---|---|---|---|---|---|
| S | DLI on | DLI off | SAFE off | CP on | INV CP on | NMODE off | NMODE on | F4 on | POF on | F11 on | F5 on |
| 0 | D | D | D | D | S13/007 | S14/009 | D | D | S16 | D | D |
| 1 | S1/039 | D | S13/005 | S1/022 | S13/007 | S14/009 | D | S15/002 | D | D | D |
| 2 | S13/010 | D | S13/005 | S13/010 | S13/007 | S14/009 | D | S15/002 | D | D | D |
| 3 | S13/010 | D | S13/005 | S13/010 | S13/007 | S14/009 | D | S15/002 | D | D | D |
| 4 | S13/010 | D | S13/005 | S13/010 | S13/007 | S14/009 | D | S15/002 | D | D | D |
| 5 | S13/010 | D | S13/005 | S13/010 | S13/007 | S14/009 | D | S15/002 | D | D | D |
| 6 | D | D | S13/005 | S6/022 | S13/007 | S14/009 | D | S15/002 | D | D | D |
| 7 | S8/022 | D | S13/005 | S13/010 | S13/007 | S14/009 | D | S15/002 | D | D | D |
| 8 | D | S13/010 | S13/005 | S13/010 | S13/007 | S14/009 | D | S15/002 | D | D | D |
| 9 | D | S10/022 | S13/005 | S13/010 | S13/007 | S14/009 | D | S15/002 | D | D | D |
| 10 | S13/010 | D | S13/005 | S13/010 | S13/007 | S14/009 | D | S15/002 | D | D | D |
| 11 | D | D | S13/005 | D | S13/007 | S14/009 | D | S15/002 | D | D | D |
| 12 | D | D | S13/005 | D | S13/007 | S14/009 | D | S15/002 | D | D | D |
| 13 | D | D | S13/005 | D | S13/007 | S14/009 | D | S15/002 | D | D | S0/038 |
| 14 | D | D | D | D | D | D | S13/022 | S15/002 | D | D | D |
| 15 | D | D | D | D | D | D | D | D | D | D | S0/003 |
| 16 | D | D | D | D | D | D | D | D | D | S0 | D |

FIG.5(c)

STATIC ANALYSIS SEQUENCE OF EVENTS TABLE

| EVT # | 72 | 70 | 71 | 53 | 46 | 45 | O | 73 |
|---|---|---|---|---|---|---|---|---|
| S | HPIT on | DELAY on | DELAY off | FIO on | NMODE off | NMODE on | POF on | OPINT on |
| 0 | $\frac{S0}{O33}$ | $\frac{S1}{O34}$ | D | D | $\frac{S3}{O09}$ | D | $\frac{S0}{O37}$ | $\frac{S0}{O32}$ |
| 1 | $\frac{S1}{O33}$ | D | $\frac{S0}{O35}$ | $\frac{S2}{O36}$ | $\frac{S3}{O09}$ | D | D | $\frac{S1}{O32}$ |
| 2 | $\frac{S2}{O33}$ | D | S0 | D | $\frac{S3}{O09}$ | D | D | $\frac{S2}{O32}$ |
| 3 | $\frac{S3}{O33}$ | D | D | D | D | S0 | D | $\frac{S3}{O32}$ |

ELEVATOR CAR DOOR AND MOTION SEQUENCE MONITORING APPARATUS AND METHOD

TECHNICAL FIELD

This invention relates to elevators and, more particularly, the monitoring thereof.

BACKGROUND ART

Several recent developments in the art of remote elevator monitoring have provided increased monitoring capabilities for maintenance and planning purposes.

For example, U.S. Pat. No. 4,568,909, entitled "Remote Elevator Monitoring System" invented by Whynacht, discloses an elevator monitor for installation in a remote building. A plurality of discrete elevator parameter signals are continually monitored in order to enable the detection of various elevator system malfunctions as defined by a plurality of Boolean expressions which, when satisfied, trigger a message signal for initiating transmission thereof to a centrally located service office.

Another approach to elevator monitoring is disclosed in U.S. Pat. No. 4,622,538 issued to Whynacht et al. In that patent, the elevator system is conceived as a system which normally operates sequentially from state to state in a closed loop chain of linked normal operating states. A plurality of two-state parameter signals are monitored and, upon assuming a particular one of the states in the closed loop chain of events, a corresponding set of parameters are monitored to determine a transition from that state to the next expected state, and so on. Transitions from a normal operating state to abnormal states are detected and transitions back to normal are also tracked. The closed loop chain model proves particularly effective in monitoring in general and in making sure that all abnormal states are detected.

Although both approaches can certainly be embodied within the controller, both have heretofore been only embodied in separate hardware made especially for the monitoring function and mounted separately from the elevator controller which is normally mounted in the elevator car itself. Owing to the separateness of the monitoring hardware these approaches have been somewhat limited in the availability of some of the more useful parameter signals which are indicative of elevator conditions.

DISCLOSURE OF THE INVENTION

The object of the present invention is to provide a more powerful elevator state monitoring method and apparatus by utilizing signals available within the elevator controller itself.

According to a first aspect of the present invention, a method and an apparatus for monitoring an elevator car is disclosed in which the states of a plurality of two-state parameter signals are monitored, each signal being indicative of one of a corresponding plurality of elevator parameters. The identity of a car operating state is determined for an elevator car which normally operates sequentially from state to state in a closed loop sequential chain of linked normal operating state, by detecting the satisfaction of a transition criterion defining a transition from an immediately preceding operating state or an immediately succeeding operating state by detecting the parameter signal state or states, alone or in combination, of one or more sensed parameter signals defining the satisfied transition criterion, each criterion indicating either a transition to a normal operating state in the chain or to an abnormal operating state, and providing selected message signals in the presence of corresponding selected transitions; and Storing a selected number of the latest of selected parameter signal state changes to occur in an event buffer and providing said selected number of the latest parameter signal states as part of said selected message signals.

According to a second aspect of the present invention, a method and an apparatus for monitoring an elevator car is disclosed in which the states of a plurality of two-state parameter signals are monitored, each signal being indicative of one of a corresponding plurality of elevator parameters. The identity of a car door state is determined for an elevator car door which normally operates sequentially from state to state in a closed loop sequential chain of linked normal operating car door states by detecting the satisfaction of a transition criterion defining a transition from an immediately preceding car door state or to an immediately succeeding car door state by detecting the parameter signal state or states, alone or in combination, of one or more sensed parameter signals defining the satisfied transition criterion, each criterion indicating either a transition to a normal car door state in the chain or to an abnormal car door state and also determining the identity of a motion state of the elevator car, which normally execute movements sequentially from state to state in a closed loop sequential chain of linked normal operating motion states, by detecting the satisfaction of a transition criterion defining a transition from an immediately preceding motion state or to an immediately succeeding motion state by detecting the parameter signal state or states, alone or in combination, of one or more sensed parameter signals defining the satisfied transition criterion, each criterion indicating either a transition to a normal motion state in the chain or to an abnormal motion state. Selected message signals are provided in response to the detection of corresponding selected transitions.

The monitoring of an elevator car according to an operating state model coupled with the storage of a selected number of the last to occur of selected events provides a powerful method for determining the nature of elevator problems. The state machine analysis provides a focused approach to elevator problem reporting and the storage of a number of recent selected parameter transitions provide a detailed look at the historical conditions immediately preceding the triggering of the shutdown message.

The monitoring of an elevator car according to a motion model and a door model provides analysis of events as seen by the elevator control mechanism itself and not once removed, i.e., input/output monitoring outside the controller. The elevator monitor, according to the present invention has three aspects. The first is recording of significant parameter signals, the second is analyzing recorded significant events for providing alarm condition, sub-standard performance condition and system usage accounting (performance) messages and the third aspect is communicating such messages outside the monitor.

The recording of significant events is implemented so as to minimize the burden on the elevator controller central processing unit and to provide the highest flexibility of change as operational control logic is enhanced in future controller modifications.

Analysis of significant events is broken down into two main categories, i.e., door analysis and motion anlysis. There can of course be both front and rear door analysis going on at the same time. Similarly, additional significant events can be monitored in a separate classification which might be called "static" conditions analysis. Such analyses provide error recognition by pre-defining valid events sequences that are normal to elevator control and comparing these to actual event sequences. Deviations from the pre-defined sequences are what invoke the alarm condition, sub-standard condition and some system usage accounting messages. Other system usage accounting messages are integral to normal event sequences. The level of analysis is greatly enhanced over the prior art by having direct access to the signals processed and generated by the control mechanism itself and thus allows the user of such internally utilized signals to have greater detail in evaluating elevator operation remotely.

Rather than looking at the elevator system as a whole and attempting to draw conclusions concerning specific abnormal events from signals which are only available externally from the elevator controller, the present invention enables the designer to look at the elevator system in an entirely new way from the inside as well as from the outside. This approach also enables the monitoring designer to look at the system in much more depth which in turn enables maintenance personnel to better serve the customer.

Furthermore, a new way of looking at the elevator system so as to provide a completely new state machine model is taught by the present invention.

These and other objects, features and advantages of the present invention will become more apparent in light of the detailed description of a best mode embodiment thereof, as illustrated in the accompanying drawing.

BRIEF DESCRIPTION OF THE DRAWING

FIG. 4(b) illustrates the state machine of FIG. 4(a) in tabular form;

FIGS. 5(b) & 5(c) are together an illustration of a motion sequence of events transition table equivalent to the state machine illustration of FIG. 5(a) in tabular form;

BEST MODE FOR CARRYING OUT THE INVENTION

Figure 1:
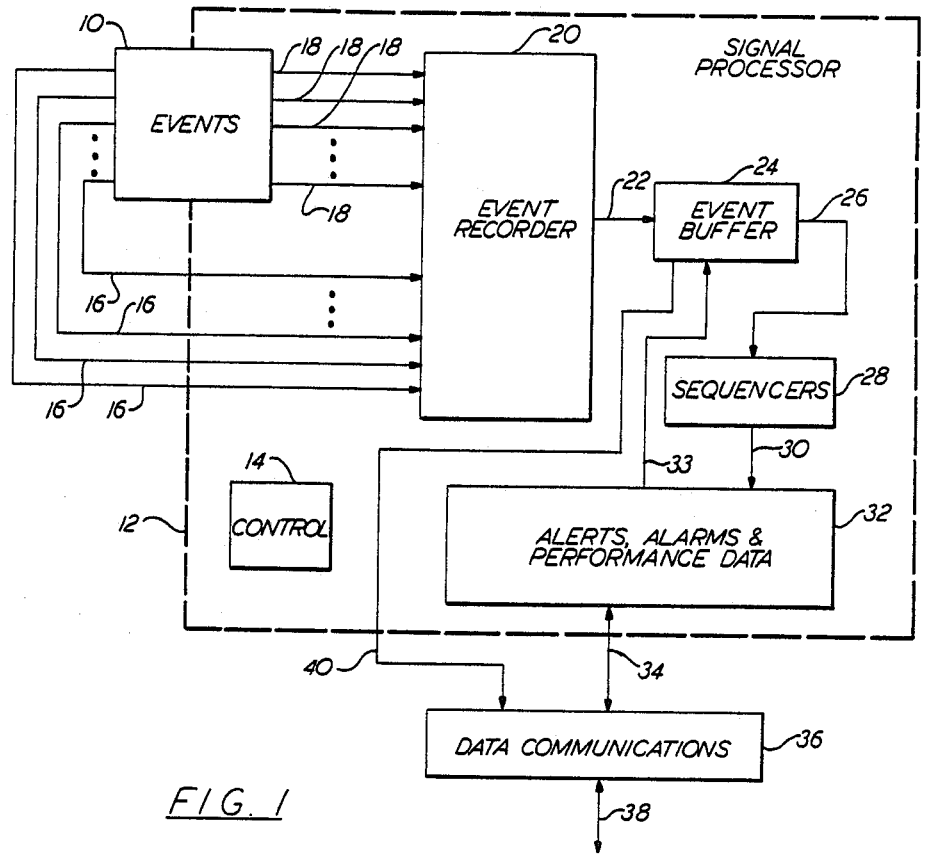
FIG. 1 is a simplified block diagram illustration of three major functions carried out, according to the method and apparatus of the present invention.

FIG. 1 is a simplified block diagram illustration of three major functions carried out according to various aspects of the method and apparatus of the present invention, i.e., event recording, event analysis and data communications. Thus, FIG. 1 is a pictorial representation of the interrelationship between the three major functions.

A plurality of elevator car related events, symbolized by a block 10, are monitored by a signal processor 12 having both monitoring and control functions. The control functions are symbolized by a block 14 and are set forth in more detail in connection with FIG. 2. The remainder of the signal processor 12 of FIG. 1 is shown dedicated to the monitoring function as taught herein.

The event block 10 is shown halfway within and halfway without the signal processor 12 in order to suggest that some of the events monitored may arise from sensors which monitor external events taking place within the elevator system and other events, which take place only within the signal processor itself, may also be monitored. External events are monitored by the signal processor by means of a plurality of elevator parameter signals 16 while internal events are monitored via a plurality of parameter signals 18. Thus, it will be understood that the word "parameter" can refer to both internal and external events.

An event recorder 20 monitors the parameter signals 16, 18. When a signal changes state, as defined in an event definition table and as indicated by a signal on a line 22, the event is logged in an event buffer 24. Event recording may be performed at different rates within the signal processor 12. For instance, event recording may be performed at the three different rates of 32 milliseconds, 200 milliseconds and 500 milliseconds. This would correspond to the update rate of the various signals in the controller as controlled by the control software. For the purposes of the present invention signals should be monitored at a frequency equal to or less than their update rate.

The event buffer 24 may be, for example and without limitation, a circular buffer (queue) containing the last 100 events monitored. The storing of the last 100 events monitored is particularly advantageous for trouble shooting purposes. These last 100 events may be stored at any time in connection with selected events, thereby providing a record of events immediately preceding the occurrence of an abnormal event, thereby providing the desired trouble shooting capability. Some events stored in the event buffer may have one or more other parameters also stored in connection therewith. For example, when car position changes the event may be logged along with the new car position.

The second major function provided, according to the present invention, is event analysis. Event signals stored in the event buffer are provided on a signal line 26 to one or more sequencers 28 running at, for example, a 500 millisecond rate. Each sequencer analyzes events that were previously logged and operates like a state machine transitioning to new states based on events being logged in the event buffer. A transition to a new state may have an associated output function, e.g., "increment door operations" or "generate an alarm message." A number of sequencers may be provided, e.g., without limitation:

(a) motion sequencing for monitoring elevator motion;
(b) front door sequencing for monitoring front door operation;
(c) rear door sequencing for monitoring rear door operation; and
(d) static sequencing for monitoring controller created failure signals such as errors in logic which determine that failures have occurred.

The sequencers 28 generate most of the alarm and alert messages and update performance data via a signal line 30 and as symbolized by an alert, alarm and performance data output handling device 32. This performs the function of keeping track of when an alert message, an alarm message or performance data messages should be sent via a signal line 34 to a data communications unit 36 and also provides a signal on a line 33 to the event buffer to tugger a transfer of the last 100 events.

The third major function as taught according to the present invention is data communications. The data communications unit 36 typically waits for commands from an external device (not shown) connected to a serial data port. Communications unit 36 may use a selected protocol with error checking. The external device is responsible for requesting information such as alarms, alerts, event buffers and performance data. Commands are performed at a 500 millisecond rate. The communications unit 36 is also responsive to a signal line 40 from the event buffer 24 by which the last 100 events may be provided over signal line 38.

Figure 2:
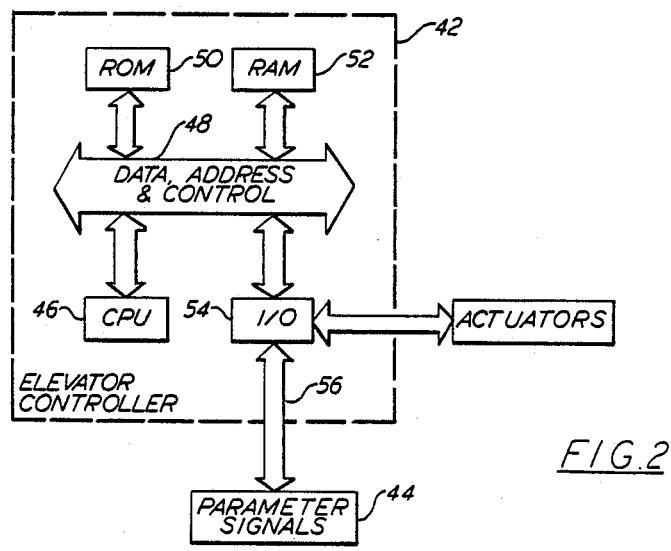
FIG. 2 is a simplified block diagram illustration of an elevator controller having a signal processor for carrying out the three major functions illustrated in FIG. 1, according to the present invention and in addition carrying out control functions for controlling the monitored elevator.

FIG. 2 is a simplified block diagram illustration of an elevator controller 42 which is a more hardware oriented representation of the signal processor 12 of FIG. 1 which, as mentioned previously, is more conceptually oriented, as an aid for teaching the central concepts of the varius aspects of the present invention. The external parameter signals or event signals are symbolized by a block 44. Internal events are monitored directly by a central processing unit (CPU) 46 via various data, address and control busses 48. The elevator controller will typically contain, in addition, a read only memory (ROM) 50, a randam access memory (RAM) 52 and an input/output (I/O) device 54, all communicating with the busses 48. The I/O device 54 will also be in direct communication with the parameter signals 44 via a plurality of signal lines 56 and a number of actuators 57 via control and sensing lines 57a. Thus, the signal processor 12 shown in conceptual form in FIG. 1 may be implemented in an elevator controller 42 such as is shown in FIG. 2. The CPU 46 of the controller 42 will normally be used for both control and monitoring functions.

As mentioned, the approach is to use a sequence of events, state transition approach. The event buffer 24 of FIG. 1 contains entries to identify transitions of key signals of the elevator control system. The sequence of event analysis takes entries from the event buffer and itself transitions from state to state. A transition from one state to another may result in the detection of a fault. These faults are then transmitted to an external monitoring computer (not shown) at the elevator site. The external computer in turn sends a message corresponding to the fault to a remote central computer (not shown) over a standard telephone line.

Figure 3:
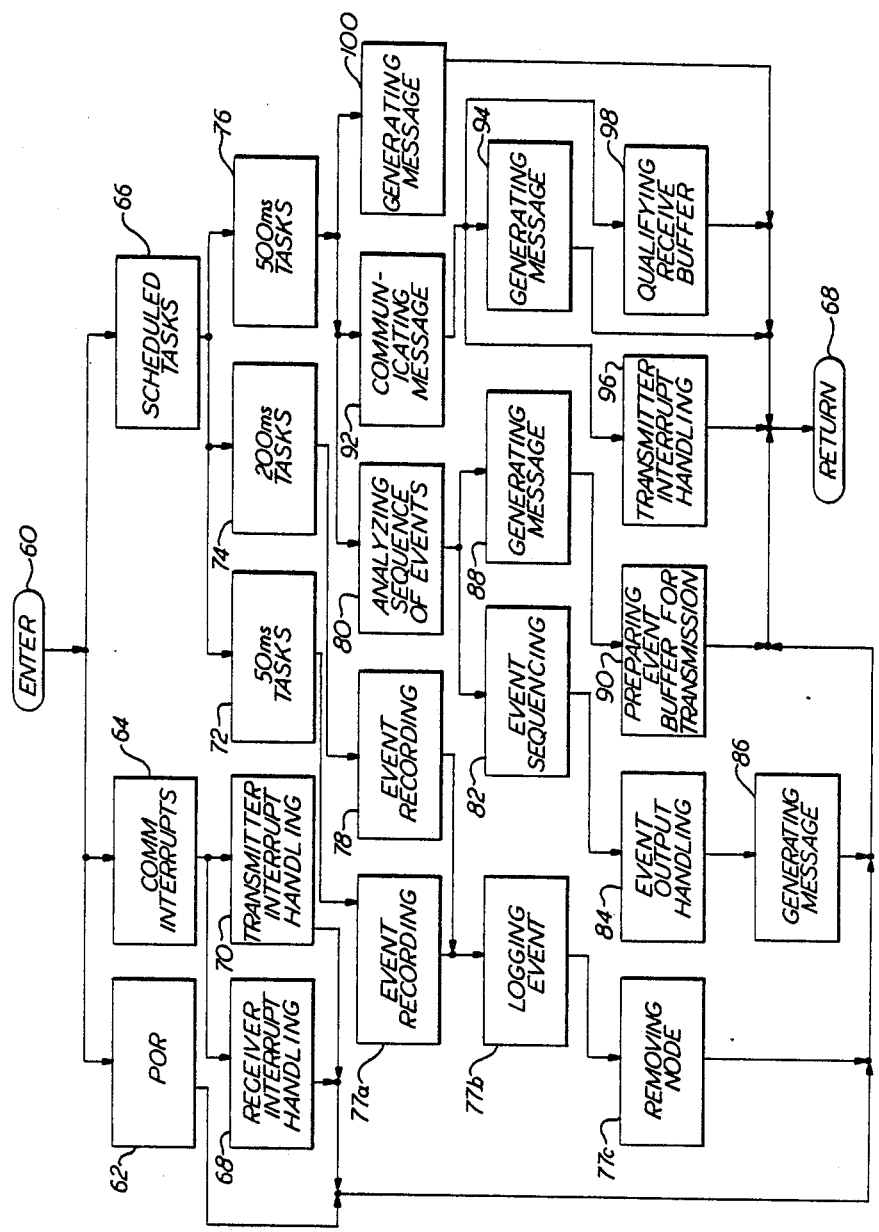
FIG. 3 is a simplified block diagram illustration of three major tasks accomplished by the signal processor illustrated in FIG. 1 and the elevator controller illustrated in FIG. 2.

FIG. 3 is a simplified block diagram illustration of three major tasks accomplished by the signal processor illustrated in FIG. 1. Although the illustration implies a flow chart type of sequential execution of the tasks in parallel, it should be understood that control functions may also be carried out by the CPU intermingled with the monitoring functions illustrated. After entering at a step 60, the signal processor 12 carries out power on reset (POR) routines 62, communication interrupts 64 and scheduled tasks 66. For purposes of the illustration, after each of these major groups of tasks 62, 64, 66 are completed, a return is made via a step 68 to the controller main program which has control responsibilities as well.

The power on reset routine of step 62 provides a mechanism for initializing the steps to be carried out in the monitoring process. Basically, this consists of four major parts:

(1) event buffer initialization;
(2) event recorder initialization;
(3) protected memory initialization; and
(4) transmitter interrupt handler initialization.

Event buffer initialization involves the initialization of a last entry pointer, a next entry pointer, and last event processed by sequencers pointer. Event recorder initialization requires the resetting of a bit array. This bit array is used by the event recorder to memorize which events have been logged to prevent the continuous logging of them while the Boolean conditions defining these events remain true. When a Boolean condition defining an event is false, the bit associated with that event is reset for the next time the true state occurs. The initialization of protected (non-volatile) memory is two fold. The first aspect is performance data initialization and the second is parameter initialization. Performance data is reset to zero and the parameters are set to default conditions defined in a ROM table. Finally, transmitter initialization requires that the transmitter be set to an empty and ready state.

The communications interrupts step 64 handles external serial communications interrupt processing. These tasks conform to and will ideally strictly enforce the selected serial communications frame protocol. The protocol is a matter of design choice and will not be described in detail as such choices are well known within the art. See for example the protocol described in U.S. Pat. No. 4,568,909 in FIG. 3. After handling both the receiver interrupts and the transmitter interrupts as symbolized by receiver interrupt handling step 68 and transmitter interrupt handling step 70 a return is made.

The scheduled tasks symbolized by a step 66 is the "main body" and contains the central teachings of the present invention, i.e., the use of a buffer in conjunction with a closed loop state model to record a selected number of the last to occur of selected parameter state transitions and also the modeling of the elevator car in both a motion context and a door context for state machine implementation. The major components of the scheduled tasks are:

(1) 50/200 millisecond event recording as shown in steps 72, 74;
(2) analysis of logged events, included within a step 76 perform every 500 milliseconds; and
(3) upper level communications processing, also symbolized by block 76.

50/200 millisecond event recording provides a data base from which to draw. This is accomplished through the use of an event recorder 20 as shown in a step 77a that maintains the contents of an event buffer 24 by logging events (as defined in an event definition table) as shown in a step 77b. A node removal step 77c is for the purpose of removing the oldest event recorded for replacement with the latest event to be recorded. The event recorder has two sub-routines. One is for logging events and one for handling event buffer overflow conditions, together shown generally as single steps 77a, 78.

Figure 4A:
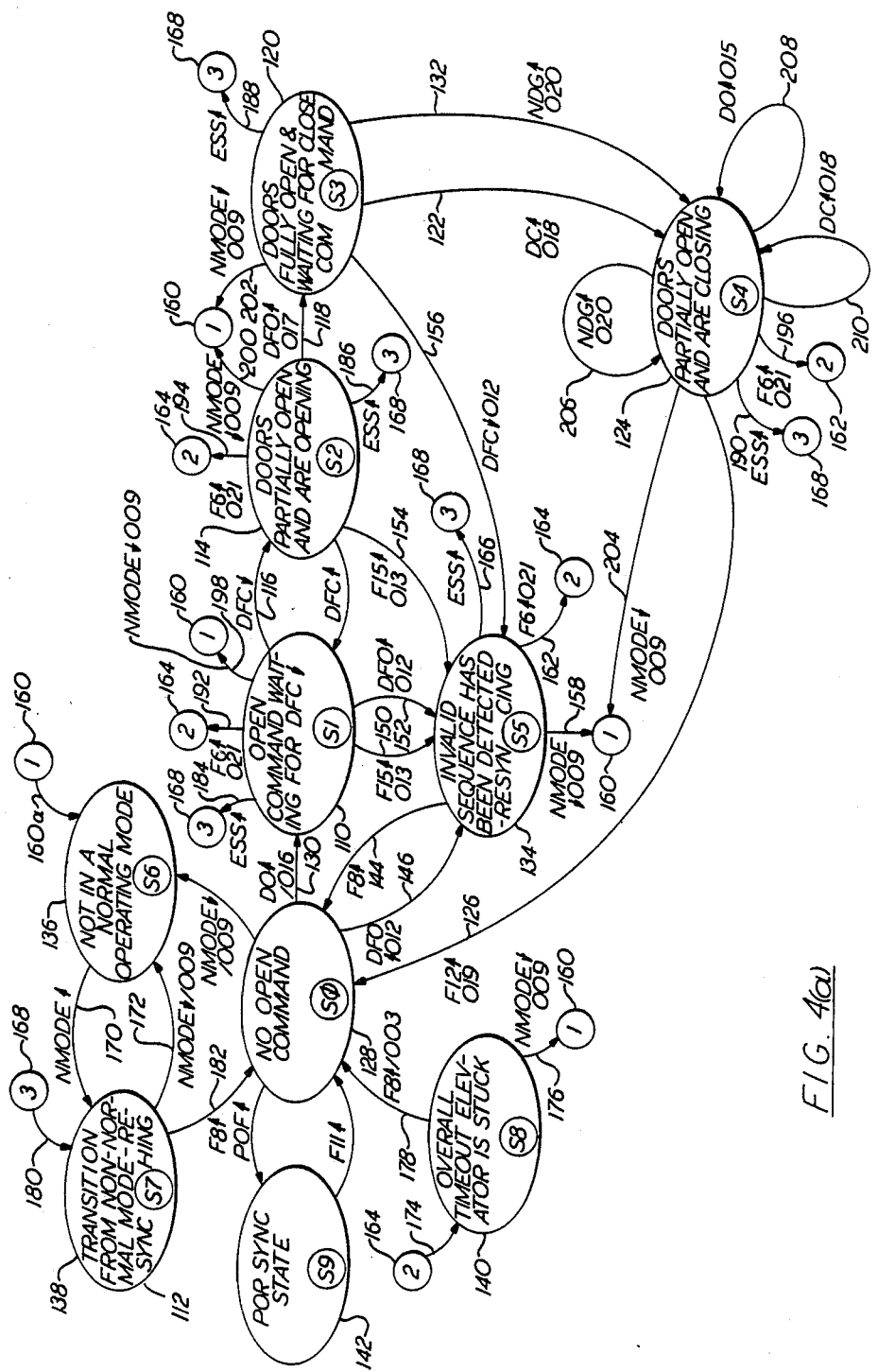
FIG. 4(a) is a conceptual illustration of an elevator monitoring state machine, according to the present invention, for monitoring an elevator car door.
Figure 5A:
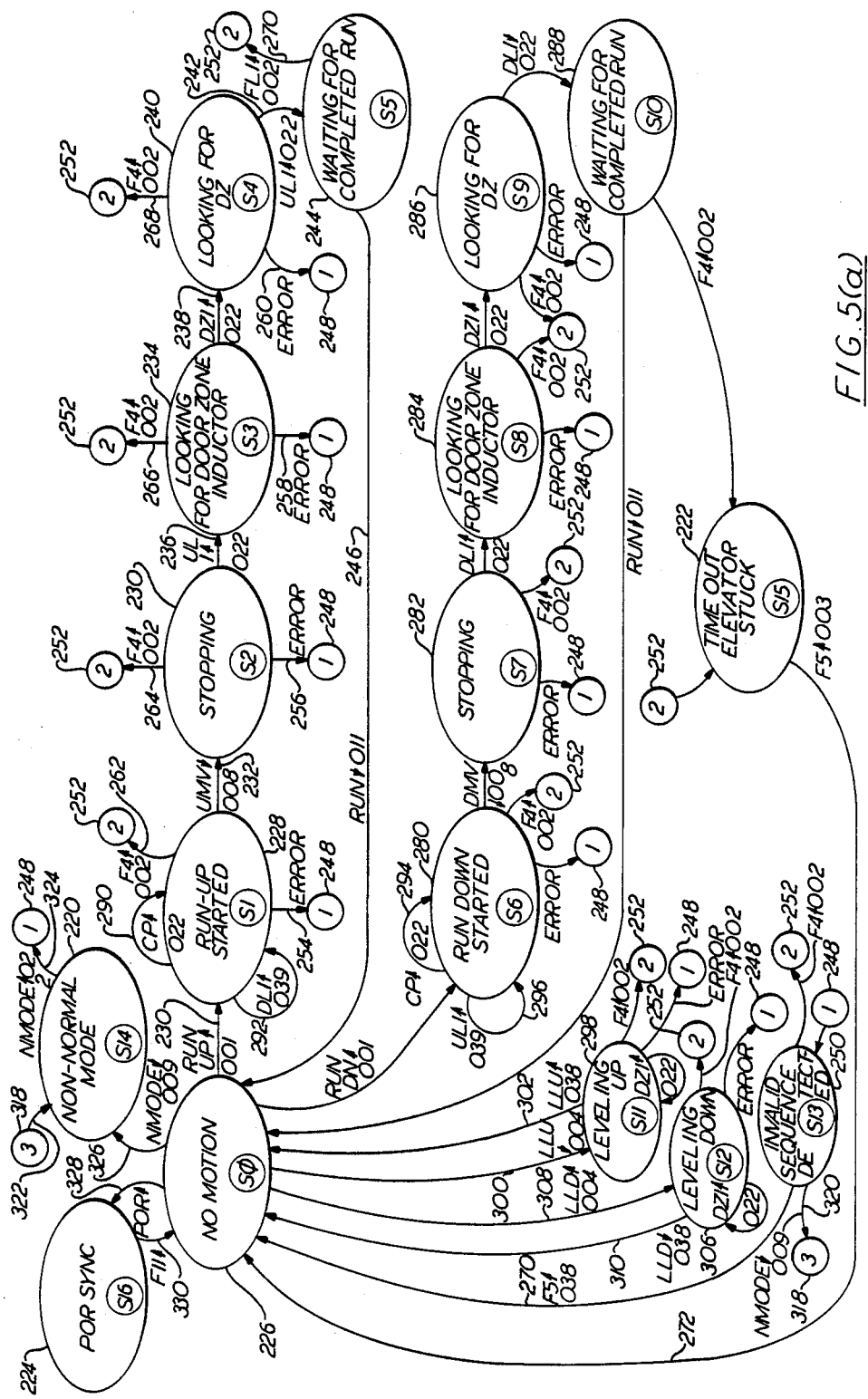
FIG. 5(a) is an illustration of the various states which an elevator car can assume when analyzed in a motion state machine fashion, according to the present invention.
Figures 6A, 6B:
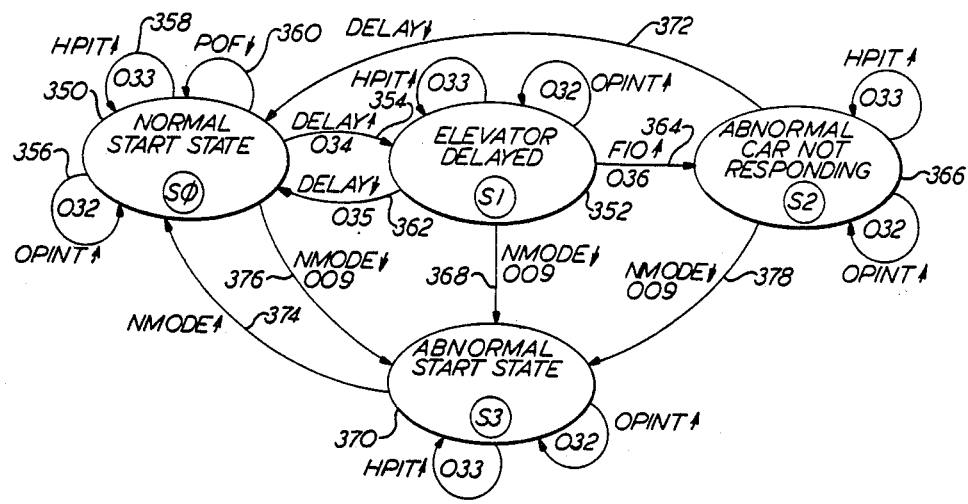
FIG. 6(a) is an illustration of a static analysis sequence of event flow diagram, according to the present invention.
FIG. 6(b) is a static analysis sequence of events table which presents the equivalent of FIG. 6(a) in tabular form.

Analysis of the events stored in the event buffer is broken down, without limitation, into four categories: front door analysis (FIG. 4(a) and FIG. 4(b)), rear door analysis (not shown because of its similarity to front door analysis), motion analysis (FIGS. 5(a), 5(b) and 5(c)) and static analysis (FIGS. 6(a) and 6(b)). These analyses are symbolized by a step 80. The event sequencing is simply symbolized by a step 82. At times it is necessary to take actions upon detection of an event. The actions performed are defined in an event output handling routine 84. Some of these actions require the generation of messages for external communication the generation of such messages is symbolized in a step 86.

After analysis in step 80, messages may need to be generated immediately for the purpose of communicating the contents of the event buffer for transmission. This is symbolized in steps 88, 90.

Upper level communications processing is performed in a step 92 by the communications processor 36. This unit controls external communications dialog and the transmission of generated messages as indicated in a step 94. During the course of a dialog, it is necessary to both handle transmitter interrupts as indicated in a step 96 and qualify a received frame's data content as indicated in a step 98 (this is accomplished by a receiver buffer qualification sub-routine which will not be shown in detail).

Messages are also generated during each 500 millisecond frame which are not transmitted immediately.

In summary, FIG. 3 outlines how events are logged and analyzed, according to one embodiment of the present invention the analysis of logged events is what provides shutdown, maintenance and performance information about the elevator system being analyzed. This information is externally communicated upon receipt of a request therefore.

Table I lists, without limitation, a number of elevator parameter signals or events which may be monitored for a particular state machine embodiment, according to the present invention, as shown in the present specification. The parameter signals are listed by number, mnemonic, by significant states (an "on" state is numerically listed; where the "off" state is also significant for analysis purposes, it is given the next highest number), and by description.

FIG. 4(a) is a conceptual aid which pictorially illustrates a elevator monitoring state machine, according to the present invention, for monitoring an elevator car door. It is an important teaching of the present invention that an elevator can be viewed in operation as going through a number of sequential normal operating door states which may be thought of as a closed loop chain of such car door states. At the same time, the elevator car is in motion or not in motion and can be analyzed in a similar fashion by having a closed loop "motion" state machine for effectively analyzing the motion states of the elevator car, as shown in FIG. 5(a)

Returning now to FIG. 4(a), there is there illustrated a state (S1) 110 in which an open command has been received and the doors are closed. Upon detecting a door fully closed off condition (event 8) a transition is made to a state (S2) 114 as indicated by a transition line 116. This state is for the condition where the doors are partially open and are opening in response to the open command.

TABLE I

| Event Number No. | Mnemonic | States | Description |
|---|---|---|---|
| 0 | POF | (on) | Power On RESET |
| 1 | DO | (on, off) | Front Door Open Command |
| 3 | DC | (on, off) | Front Door Close Command |
| 5 | DFO | (on, off) | Front Door Fully Open Switch |
| 7 | DFC | (on, off) | Front Door Fully Closed Switch |
| 9 | GDS | (on, off) | Gate Door Switch CHAIN |
| 11 | DT | (on, off) | Front Door Time Command |
| 13 | NDG | (on) | Front Door Nudging Command |
| 14 | DCB | (on, off) | Front Door Close Button |
| 16 | DOB | (on, off) | Front Door Open Button |
| 18 | RVD1 | (on, off) | Front Reversal Device |
| 20 | RVD2 | (on, off) | Front Reversal Device |
| 22 | RDO | (on, off) | Rear Open Door Command |
| 24 | RDC | (on, off) | Rear Door Closed Command |
| 26 | RDFO | (on, off) | Rear Door Fully Open Switch |
| 28 | RDFC | (on, off) | Rear Door Fully Closed Switch |
| 20 | RNDG | (on) | Rear Door Nudging Command |
| 31 | REARDT | (on, off) | REAR Door Time Command |
| 33 | RDCB | (on, off) | Rear Door Closed Button |
| 35 | RDOB | (on, off) | Rear Door Open Button |
| 37 | RRVD1 | (on, off) | Rear Reversal Device |
| 39 | RRVD2 | (on, off) | Rear Reversal Device |
| 41 | SAFE | (on, off) | SAFE Variable |
| 43 | CP | (on) | CP change by 1 (Func 1) |
| 44 | INVCP | (on) | Invalid Change in CP (Func 2) |
| 45 | NMODE | (on, off) | Mode is Normal (on) (Func 3) |
| 47 | F4 | (on) | Motion State Timer Enabled and Timed Out |
| 48 | F5 | (on) | Motion State from SOE = 13 or 15 and (RUN = LLU = LLD = 0) and ESS = 0 |
| 49 | F6 | (on) | Front Door State Timer Enabled and Timed Out |
| 50 | F7 | (on) | Rear Door State Timer Enabled and Timed Out |
| 51 | F8 | (on) | Front Door State from SOE = 5, 7, or 8 and DFC = 1 and DO = 0 and ESS = 0 |
| 52 | F9 | (on) | Rear Door State from SOE = 5, 7 or 8 and RDFC = 1 and RDO = 0 and ESS = 0 |
| 53 | F10 | (on) | Delayed Car Timer Enabled and Timed Out |
| 54 | RUNUP | (on) | LAU and RUN going to 1 |
| 55 | RUNDN | (on) | LSD and RUN going to 1 |
| 56 | LLU | (on, off) | Latched Level Up |
| 58 | LLD | (on, off) | Latched Level Down |
| 60 | UMV | (on, off) | Up Main Valve Command |
| 62 | DMV | (on, off) | Down Main Valve COMMAND |
| 64 | ULI | (ON, OFF) | Up Leveling Indicator |

TABLE I-continued

| Event Number No. | Mnemonic | States | Description |
|---|---|---|---|
| 66 | DLI | (on, off) | Down Leveling Indicator |
| 68 | DZI | (on, off) | Door Zone Indicator |
| 70 | DELAY | (on, off) | 60 and not 6DS and DFC and (RDFC or not RDFLG) or not Rsafe and mode is normal (FUNC 14) |
| 72 | HPIT | (on) | High Pit Oil Transition |
| 73 | DPINT | | Operator Interrupt Switch |
| 74 | RUN | (off) | Run Command |
| 75 | F11 | (on) | Run = LLU = LLD = 0 and DFC and (RDFC or not RDFLG) and not DO and (not RDO or RDFLG) and mode is normal and not F11 |
| 81 | F12 | (on) | DFC and not DO |
| 82 | F13 | (on) | RDFC and not RDO and RDFLG |
| 83 | F15 | (on) | /DO./DFO |
| 84 | F16 | (on) | /RDO./RDFO.RDFLG |
| 85 | ESS | (on, off) | Emergency Stop Switch |

Assuming that the doors continue opening and ultimately assume the fully open position (event 5), a transition is made, as indicated by a transition line 118, to a state (S3) 120 in which the doors are fully open and waiting for a close command. Upon receiving such a command (event 3) a transition is made as indicated by a transition line 122 to a state (S4) 124 in which the doors are partially open and are closing in response to the close command. Upon sensing that the doors are fully closed and no door open command (event 81) a transition is made as indicated by a transition line 126 to a corresponding state (S0) 128 in which the doors are closed and no door open command has been received. Upon receiving such a command (event 1) a transition is made, as indicated by a transition line 130, to the state (S1) 110 in which the open command has been received and a door fully closed condition is awaited.

The above described closed loop chain of normal operating car door states is the expected sequence for a normally operating elevator car. It will be noted in connection with many of the transition lines described that in addition to the mnemonic taken from Table I, there is also listed a three digit number which refers to an output function to be performed as outlined in Table II. Thus, for example, for the transition from state (S2) 114 to state (S3) 120 there is an output function number 017 listed in Table II characterized as "front door open complete" listing two output functions including "A. Cancel front door state timer and stop front door timer" and "B. IF door open timer exceeded limit THEN select maintenance request message 30 and generate message."

TABLE II

| | |
|---|---|
| 001 | Start of run<br>A. Enable and initialize run timer<br>B. Enable and initialize motion state time to 2 minute timeout<br>C. Increment total run performance counter<br>D. Log synchronous position<br>E. Reset REM "Motion Detected" Flag |
| 002 | Elevator not responding<br>A. Cancel motion state timer<br>B. Determine if passenger trapped<br>C. Select shutdown message 12 or 13 and generate message. |
| 003 | Failed condition has been resolved<br>A. Select shutdown messge 6 and generate message. |
| 004 | State of leveling<br>A. Increment leveling performance counter<br>B. Enable and initialize motion state timer to 2 monute timeout |
| 005 | Car is unsafe to run<br>A. Enable and initialize motion state timer<br>B. Select maintenance request message 38 and generate message.<br>C. Update reason identifier of message 38<br>D. IF number of occurrences of message 38 equals 15 THEN select message 14 and generate message. |
| 006 | Run aborted<br>A. Select maintenance request message 39 and generate message. |
| 007 | Invalid change in CP<br>A. Select maintenance request message 40 and generate message. |
| 008 | State of deceleration<br>A. Initialize deceleration timer<br>B. Reset motion state timer to 2 minute timeout |
| 009 | Transition to non-normal mode<br>A. Stop motion state timer<br>B. Stop front and rear door state timers<br>C. Stop delayed car timer |
| 010 | Invalid inductor sequence<br>A. Select maintenance request message 41 and generate message. |
| 011 | End of run<br>A. Cancel motion state timer, run timer and deceleration timer<br>B. Log synchronous position<br>C. IF this run is to be analyzed for run time THEN IF the run timer is → the run time limit contract condition THEN select maintenance message 6 and generate message.<br>D. IF the deceleration timer is → the deceleration time limit contract condition THEN select maintenance message 1 and generate message.<br>E. Add run timer to total time counter<br>F. IF total run time counter is → 120 THEN subtract 120 from the total run time counter and add 1 to the total run time in minutes performance counter |
| 012 | Malfunctioning door switches<br>A. Select maintenance request message 34 and generate message. |
| 013 | Failure of front doors to open<br>A. Select maintenance request message 32 and generate message.<br>B. IF number of occurrences of this message equals 15 THEN Select shutdown message 15 and generate message. |
| 014 | Front door lock bounce<br>A. Select maintenance request message 37 and generate message. |
| 015 | Front door reversal<br>A. Increment front door reversal count<br>B. Cancel front door state timer |
| 016 | Start of front door cycle<br>A. Increment front door operation performance count<br>B. Enable and Initialize front door state timer<br>C. Enable and Initialize front door timer |
| 017 | Front door open complete<br>A. Cancel front door state timer and stop front door timer<br>B. IF door open time exceeded limit THEN select maintenance request message 30 and generate message. |
| 018 | Start of front door close<br>A. Enable and start front door state timer<br>B. IF not Nudging and front doors are fully opened THEN Enable and Initialize front |

TABLE II-continued

019 Front door close complete
  A. Cancel front door state timer
  B. IF front door timer is not enabled THEN RETURN
  C. Stop front door timer
  D. IF front door close time exceeded limit THEN increment front door close exceedance performance counter
  E. IF excessive front door closing time exceedances THEN select maintenance request message and generate message.
020 Front door nudging
  A. Increment nudging performance counter
  B. Inhibit front door closing time
  C. IF excessive nudging THEN select maintenance request message 2 and generate message.
021 Front door state timer limit exceeded
  A. Cancel front door state timer
  B. Determine if passenger trapped
  C. Select shutdown message 2 or 4 and generate message.
022 Transition to a new motion state
  A. Set REM "Motion Detected" Flag
023 Start of rear door cycle
  A. Increment rear door operation performance count
  B. Enable and initialize rear door state timer
  C. Initialize rear door timer
024 Failure of rear doors to open
  A. Select maintenance request message 33 and generate message.
  B. IF number of occurrences of this message equals 15 THEN Select shutdown message 15 and generate message.
025 Rear door state timer limit exceeded
  A. Cancel rear door state timer
  B. Determine if passenger trapped
  C. Select shutdown message 2 or 4 and generate message.
026 Start of rear door close
  A. Enable and start rear door state timer
  B. IF not rear Nudging and rear doors are fully open THEN Enable and Initialize rear door timer
027 Rear door nudging
  A. Increment rear nudging performance counter
  B. Inhibit rear door closing timer
  C. IF excessive nudging THEN select maintenance request message 4 and generate message.
028 Rear door reversal
  A. Increment rear door reversal counter
  B. Cancel rear door state timer
029 Rear door close complete
  A. Cancel rear door state timer and stop rear door timer
  B. IF rear door timer is not enabled THEN go to step 2
  C. Stop rear door timer
  D. IF door close time exceeded limt THEN increment rear door close exceedance performance counter
  E. IF excessive door closing time exceedances THEN select maintenance request message 5 and generate message
030 Rear door lock bounce
  A. Select maintenance request message and generate message.
031 Rear door open complete
  A. Cancel rear door state timer and stop rear door timer
  B. IF door open time exceeded limit THEN select maintenance request message 31 and generate message.
032 Select shutdown message 18 and generate message
033 High pit oil detected
  A. Select maintenance request message 28 and generate message.
034 Start of delayed car
  A. Enable and start delayed car timer
035 Car no longer delayed
  A. Cancel delayed car timer
036 Delayed car timer exceeded
  A. Cancel delayed car timer
  B. Select shutdown message 12 and generate message.
037 Power on reset
  A. IF the power on reset generate message contract condition flag is set THEN select shutdown message 11 and generate message.
  B. Reset power on reset ID byte
038 Cancel motion state timer
  A. Cancel motion state timer
039 Elevator Motion Detected
  A. Set REM "Motion Detected" Flag The explanation for these output functions is straightforward. A front door state timer (either a hardware or software timer) would previously have been started upon making a transition from state (S0) 128 to state (S1) 110 as indicated by a transition line 130 which in turn refers to output function number 016 in Table II. Thus, from the time that a door open command is received until the time that a door fully open condition is sensed, the state machine will have transitioned from state (S0) 128 through states (S1) 110 and (S2) 114 to state (S3) 120. This is timed by the front door state timer and then compared to a time limit for door opening which is preselected and stored for comparison. If the limit is exceeded then a selected maintenance request message listed numerically as number 30 in Table III is generated. In addition, a running tally is kept of the number of occurrences of this sort of time limit exceedance. Thus, an additional data word is provided to so inform. Additional information is provided by additional data words, as shown in Table III, as to exactly what the time limit is, the last time that a failure occurred and the exact landing of the last occurrence of a time limit exceedance. All of this extra information is highly focused and very useful for maintenance purposes.

TABLE III

| SUB-TYPE | DEFINITION | DATA WORD 1 | DATA WORD 2 | DATA WORD 3 | DATA WORD 4 | DATA WORD 5 |
|---|---|---|---|---|---|---|
| SHUTDOWN MESSAGES (TYPE 01) | | | | | | |
| 1 | Trapped passenger | Committable landing | Car at landing | Car stall protect | REM state | Safe |
| 2 | Trapped passenger malfunction doors | Committable landing | Car at landing | Car stall protect | REM state | Safe |
| 3 | Stalled car | Committable landing | Car at landing | Car stall protect | REM state | Safe |
| 4 | Stalled car malfunction | Committable landing | Car at landing | Car stall protect | REM state | Safe |

TABLE III-continued

| SUB-TYPE | DEFINITION | DATA WORD 1 | DATA WORD 2 | DATA WORD 3 | DATA WORD 4 | DATA WORD 5 |
|---|---|---|---|---|---|---|
| | doors | | | | | |
| 5 | Stalled car door stuck | Committable landing | Car at landing | Car stall protect | REM state | Safe |
| 6–10 | Condition resolved back in service | Committable landing | Car at landing | Car stall protect | REM state | Safe |
| 11 | Back in service by power cycled | TSK000 | INT000 | STRT00, STRT01 | LST000, LST001 | STACK POINTER |
| 12 | Car not responding | Committable landing | Car at landing | Car stall protect | REM state | Safe |
| 13 | Trapped passenger car not responding | Committable landing | Car at landing | Car stall protect | REM state | Safe |
| 14 | Frequent safety chain failures | Committable landing | Car at landing | Car stall protect | REM state | Safe |
| 15 | Frequent door open failures | Committable landing | Car at landing | Car stall protect | REM state | Safe |
| 16 | ECS not running (generated by external computer) | Committable landing | Car at landing | Car stall protect | REM state | Safe |
| 17 | REM buffer overrun | Committable landing | Car at landing | Car stall protect | REM state | Safe |
| 18 | Operator interrupt | Committable landing | Car at landing | Car stall protect | REM state | Safe |
| MAINTENANCE MESSAGES (TYPE 02) | | | | | | |
| 1 | Deceleration time limit exceeded | Number of occurrences | Limit | Last failure time | Landing of last occurrence | |
| 2 | Excessive nudges | Number of occurrences | Number of nudges | Number door operations | Limit | |
| 3 | Door close time limit | Number of occurrences | Limit | Last failure time | Landing of last occurrence | |
| 4 | Excessive nudges exceeded | Number of occurrences | Number of nudges | Number door operations | Limit | |
| 5 | Rear close time limit exceeded | Number of occurrences | Limit | Last failure time | Landing of last occurrence | |
| 6 | Run time between landings exceeded | Number of occurrences | Limit | Last failure time | First landing | Second landing |
| 28 | High pit oil | Number of occurrences | | | | |
| 29 | Spare | | | | | |
| 30 | Door open time limit exceeded | Number of occurrences | Limit | Last failure time | Landing of last occurrence | |
| 31 | Rear open time limit exceeded | Number of occurrences | Limit | Last failure time | Landing of last occurrence | |
| 32 | Failure of doors to open detected | Number of occurrences | Landing of last occurrence | REM state | Emergency stop | |
| 33 | Failure of rear doors to open detected | Number of occurrences | Landing of last occurrence | REM state | Emergency stop | |
| 34 | Malfunction door switches | Number of occurrences | Landing of last occurrence | REM state | Emergency stop | |
| 35 | Spare | | | | | |
| 36 | Rear lock bounce | Number of occurrence | Landing of last occurrence | | | |
| 37 | Front lock bounce | Number of occurrences | Landing of last occurrence | | | |
| 38 | Safety chain break | Number of occurrences | Landing of last occurrence | | | |
| 39 | Run aborted | Number of occurrences | Landing of last occurrence | REM state | Emergency stop | Motion detected |
| 40 | Invalid | Number of | Landing | | | |

TABLE III-continued

| SUB-TYPE | DEFINITION | DATA WORD 1 | DATA WORD 2 | DATA WORD 3 | DATA WORD 4 | DATA WORD 5 |
|---|---|---|---|---|---|---|
| | change in committable position | occurrences | of last occurrences | | | |
| 41 | Invalid inductor sequence | Number of occurrences | Landing of last occurrence | REM state | | |
| | | | PERFORMANCE DATA (TYPE 03) | | | |
| 1 | Front door information | Front door operations | Front door reversals | Front door nudges | Front door close exceedances | |
| 2 | Rear door/ information | Rear door operations | Rear door reversals | Rear door nudges | Rear door close exceedances | Number of runs |
| 3 | Run information | Demand minutes | Running minutes | Relevels | | |
| 4 | For elevonic | Empty runs up | Empty runs down | Partial runs up | Partial runs down | |
| 5 | For elevonic | Full runs up | Full runs down | | | |

Similarly, in connection with the transition from state (S3) 120 to state (S4) 124, there is an output function number 018 executed which in Table II is characterized as "start of front door close" and includes "A. Enable and start front door state timer" which is used, in this case, to time the closing of the door. If there is no "nudging" present and the front doors are fully opened then a front door timer is also enabled and initialized. The front door state timer is cancelled and the front door timer stopped upon a transition from state (S4) 124 to state (S0) 128 upon detecting the door fully closed and no door open command being present. The front door close time is compared to a limit stored in memory and if excessive an exceedance counter is incremented and a selected maintenance request message is generated. Thus, in transitioning from state (S0) 128 all the way around the loop via states 110, 114, 120, 124, 128, we end up with two timings of the door operations, i.e., the time that it takes to open the doors and the time that it takes to close the doors, assuming no outside interference. Any exceedances will be counted and transmitted as messages for storage or immediate usage, as desired.

It will be noted that there are two distinct paths possible from state (S3) 120 to state (S4) 124. The transition indicated by the transition line 122 has already been discussed. An alternate transition may be made, as indicated by a transition line 132, if a front door nudging command (event 13) is detected. This will occur if the car door is being held open for longer than a selected period of time. This is timed as indicated by an output function 020 in Table II in which a nudging performance counter is incremented and the front door closing time is inhibited, i.e., the timer is shut off due to a lack of any desire to monitor while in nudging. If nudging has occurred in a predetermined number of sequential door cycles then a maintenance request message number 2 from Table III, i.e., the excessive nudges message is provided along with the number of occurrences, the number of nudges, the number of door operations and the limit.

It will be observed from FIG. 4(a) that in addition to the normal operating states 110, 114, 120, 124, 128 there are a number of abnormal car door operating states S5, S6, S7, S8, S9, corresponding respectively to numbered states 134, 136, 138, 140, 142. The first of these (S5) 134 represents a state indicative of an invalid sequence which has been detected. Transitions from each of the states in the normal operating chain may be made to state 134 except from state (S4) 124. In most cases, once a transition has been made to state (S5) 134, a transition back to the normal chain cannot be made directly (except for a transition indicated by a line 144 back to state (S0) 128) but must first go through either one of states 136, 112, or 140 before ultimately getting back to the chain by entering state 128.

An abnormal transition from state 128 to state 134 is indicated by a transition line 146 and occurs when the front door is detected as being fully open (event 5). In that case, reference to output function 012 in Table II indicates that the door switches are malfunctioning and that maintenance request message number 34 should be selected from Table III and generated. This message is defined as malfunctioning door switches and communicates the number of occurrences, the landing of last occurrence, the sequencer state (that caused the transition and the state of emergency stop buttom. Of course, the door being fully open would not be logically correct, considering that a transition from state 124 to state 128 had previously been made and no open command had been received as of yet.

Similarly, if the doors are first detected as not being fully closed after entering state 128 then there is a logical problem in that a transition would not have been made from state 124 to 128 unless the doors were already detected as fully closed as indicated by the detection of event 81 (F12) on transition line 126.

A transition back to state (S0) 128 may be made from state (S5) 134 directly if event 51 is detected, i.e., if the front door state in such that the door has been detected as being fully closed, a door open command has not been received and the emergency stop switch is off.

There are two possible transitions from state 110 to state 134. The first of these, as indicated by a transition line 150 occurs when the door open command is cancelled and the doors are not fully open. An output function number 013 is indicated from Table II at this point indicating that the front doors have failed to open in response to a door open command; a maintenance request message number 32 is selected from Table III indicating the fact that the doors have failed to open, the number of occurrences so far, the landing of last occurrence, the monitoring state, and the emergency stop condition. If the number of occurrences of this message equals some selected number, e.g., 15, then a shutdown message number 15 is selected from Table III indicating that frequent door open failures have occurred, the committable landing, the landing that the car was last at, the car stall protect status (this is unique to hydraulic elevators) the monitoring state, and a safety chain status indication.

A second type of transition may be made from state 110 to state 134 as indicated by a transition line 152 which occurs when the door is detected as being fully opened before transitioning in a normal fashion from state 110 to state 114. This will trigger a 012 output function as shown in Table II indicating that a malfunctioning door switch situtation exists and that maintenance request message 34 should be selected from Table III indicating that the door switches are malfunctioning, the number of occurrences, the landing of last occurrence, the monitoring state and the emergency stop status.

One transition is possible from state (S2) 114 to state (S5) 134 and that occurs if event 83 (door open command cancelled) is detected while the doors are not fully opened. In that case, an output function number 013 is selected from Table II indicating that a failure of the door opening process has occurred, that a maintenance request message number 32 should be selected from Table III and that if the number of occurrences of this message is equal to 15 then a shutdown message number 15 should be selected from Table III. These are the same messages that were sent for transition 150 from state 110 to state 134.

It is also possible to transition from state (S3) 120 to state (S5) 134 as indicated by a transition line 156 which occurs when the doors are fully opened and waiting for a close command while a door fully closed condition is detected as having been in existance already and then taken away while in state 120. This is illogical and indicates an invalid sequence, necessitating a transition to state 134.

There are two ways of getting out of state 134. The first is if event 46 is detected (NMODE in the "off" state), i.e., that the mode is not normal (this occurs primarily in maintenance modes). In that case, an output function 009 is selected from Table II indicating that a transition to a non-normal mode has occurred and that therefore the motion state timer is stopped (see FIG. 5(a) description below), the door state timer is stopped and the delayed car timer is stopped (see FIG. 6(a) description below. These are started on transitions such as event 1. (There are two timers associated with the car door state machine: door close and state timer). This transition is indicated by a transition line 158 to a dummy state (1) 160 which is merely drawn for the purposes of the Figure and in reality continues on to state 136 via a transition line 160a without stopping. State 136 will be described subsequentially.

The other transition path out of state 134 is indicated by a transition line 162 to another dummy state (2) 164 upon detection of the door state timer being enabled and timed out (event 49). In that case, an output function 021 is selected from Table II indicating that the front door state timer limit is exceeded, initiating the cancellation of the front door state timer, a determination as to whether or not a passenger is trapped and a selection of shutdown message two or four and the generation thereof. If it is determined that a trapped passenger condition exists then shutdown message 2 is sent and, if not, shutdown message 4 is sent, indicating respectively, that a passenger is in the car due to a malfunction of the doors or that the car is stalled due to a malfunction of the doors.

A third possible transition out of state 134 occurs when the emergency stop switch is detected in the on position as indicated by a transition line 166 to another dummy state (3) 168.

The dummy states (1, 2, 3) 160, 164, 168, in reality correspond to three states previously described, i.e., states (S6, S8, S7) 136, 140, 112. State (S6) 136 is a state indicative that the elevator car is not in a normal operating mode and can be transitioned from only if the elevator car is detected to be in a normal mode (event 45) as indicated by a transition line 170 from state 136 to state 138. A transition back to state 136 from state 138 can be made as indicated by a transition line 172 which occurs when event 45 is detected as going into the non-normal mode. At that time, an output function 009 is selected for execution as indicated by Table II in which the motion state timer is stopped, the door state timer is stopped and the delayed car timer is stopped.

A transition from dummy state 164 to state 140, indicative of a stuck elevator (due to overall time out of the door state timer) is indicated by a transition line 174. A transition out of state 140 is possible, as indicated by a transition line 176, to dummy state 160 if event 45 is detected in a non-normal mode. In that case, a transition is made to state 136, as before in connection with transition 158. Another possible transition oath is indicated by a transition line 178 which occurs if the door is detected as being fully closed, a door open command has not been given and the emergency stop switch is non-activated. In that case, an output function number 003 is selected from Table II indicating that a failed condition has been resolved and that shutdown message number 6 should be selected from Table III, indicating that the condition is resolved and the elevator car is back in service. In addition, the committable landing, the car landing, the car stall protect, the monitoring state and the state of the safety chain is also indicated. The destination state 128 permits a resumption of a normal state-to-state sequence in the closed loop chain of normal car door operating states.

Upon entry to dummy state (3) 168 a transition is made, as indicated by a transition line 180 to state (S7) 112 indicative of a transition from a non-normal mode. Transitions may be made to and from state (S7) 112 to state (S6) 136, as previously described. A transition out of state (S7) 112 to state (S0) 128 is indicated by a transition line 182 which occurs when event 51 occurs, i.e., the door is detected as being fully closed, there is no door open command and the emergency stop switch is not on. State (S7) is normally entered only upon activation of the emergency stop switch from any of the states 110, 114, 120, 134 as indicated, respectively, by transition lines 184, 186, 188, 190, 166.

In a similar manner, transitions from states 110, 114, 124, 134 to dummy state (2) 164 are made as indicated, respectively, by transition lines 192, 194, 196, 162, in the presence of event 49, i.e., the front door state timer being enabled and timed out. In other words, a shutdown condition requiring from Table II, output function 021 indicating that the front door state timer limit is exceeded and that therefore the front door state timer should be cancelled, and that a determination is to be made as to whether or not a passenger is trapped. Depending on the outcome of the determination, shutdown message 2 or 4 is generated, as described previously in connection with transition line 162.

In similar fashion, transitions may be made from any of the normal states 110, 114, 120, 124, as indicated, respectively, by transition lines 198, 200, 202, 204, in the presence of the mode going into a non-normal state (event 46). Output function 009 from Table II is then executed in which the motion state timer is stopped, the front and rear door state timers are stopped, and the delayed car timer is stopped.

There are several transition paths associated with state (S4) 124 in which a transition is made from state 124 directly back again into state 124. A transition line 206 indicates such a transition in the presence of a front door nudging command which in turn initiates output function 020 in Table II, in which the nudging performance counter is incremented, the front door closing time is inhibited, and if excessive nudging occurs then maintenance request message 2 is generated out of Table II, i.e., the excessive nudges message with the number of occurrences, number of nudges, number of door operations and the limit. Similarly, a transition line 208 indicates a transition out of state 124 and back again into state 124 in the presence of a door open command while the doors are partially open and are closing, i.e., as indicated by output function 015 in Table II, the front doors have reversed and the front door reversal count is to be incremented, as well as cancelling the front door state timer. Similarly, a transition line 210 is indicative of a transition out of state 124 and back again into state 124 in the presence of a door close command (event 3) while the doors are partially open and are closing. This indicates an output function 018 from Table II indicating the start of a front door close operation such that the front door state timer is enabled and started and the front door timer is enabled and initialized, if nudging is not present and the front doors are fully opened.

Referring now to FIG. 4(b), a table is there illustrated in which the state machine of FIG. 4(a) is presented in tabular form. The format is to have the states listed from 1 to 9 in a vertical column at the left with the various events from Table I listed horizontally along the top of table. The mnemonic associated with the event is also provided right underneath the numeral. The table is read by, for example, locating a state, e.g., state (S2) in the first vertical column and reading across horizontally until reaching vertical column 8 and determining what transition will be made upon the occurrence of event 8 which, in this case, indicates a transition to state (S3) (indicated above a horizontal line within a box at the intersection of state (S2) and event 8) with an output function 017 indicated under the horizontal line, from Table II. This is the same as shown in transition line 118 of FIG. 4(a). The boxes with "D" within are "don't care" boxes which are not relevant and are not programmed into the state machine.

Referring now to FIG. 5(a), there is illustrated a representation of the various states which an elevator car can assume when analyzed in a "motion" state machine fashion. All the states pictured in FIG. 5(a) go to a state (S14) 220 when event 45 enters a non-normal condition, except for states (S15 & S16) 222, 224, with output action 009 from Table II, i.e., a transition to a non-normal mode initiating the stopping of the motion state timer, the front and rear door state timers and the delayed card timer. A state (S0) 226 is the starting state when the mode is normal; otherwise the starting state is state (S14) 220.

Beginning with no motion in normal state (S0) 226, a transition is made to a run-up started state (S1) 228 as indicated by a transition line 230 upon detection of a run command (event 74). A start of run output function 001 from Table II is then initiated in which the run timer is enabled and initialized, the motion state timer is enabled and initialized, the total run performance is incremented, the synchronous position is logged and the "motion detected" flag is reset, indicating the start of a run up. A normal transition from state (S1) 228 to a state (S2) 230 indicative of the car stopping is made upon detection of the lack of an up main valve command (event 61) which in turn initiates function 008 from state 2 in which a state of deceleration is declared by initializing a deceleration timer and resetting the motion state timer to the time out period selected. The transition from state (S1) 228 to state (S2) 230 is indicated by a transition line 232.

A normal transition from state (S2) 230 to a state (S3) 234 is indicated by a transition line 236 which occurs upon the detection of an up leveling inducator (event 64) which in turn initiates an output function 022 from Table II, i.e., a transition to a new motion state in which the motion state timer is reset to the selected time out period and the "motion detected" flag is set. This state is indicative of the car looking for the door zone inductor.

A normal transition may be made from state (S3) 234 upon detection of the door zone inductor (event 68) as indicated by a transition line 238 to a state (S4) 240 accompanied by an output function 022 from Table II wherein a new motion state is declared by resetting the motion state timer and setting the "motion detected" flag. State (S4) 240 is indicative of the car looking for the door zone. A normal transition may be made from state (S4) 240 as indicated by a transition line 242 to a state (S5) 244 upon the detection of the up leveling inductor going low (event 65) which is accompanied by the output function 022 in which a transition to a new motion state is declared, again, by resetting the motion state timer and setting the "motion detected" flag. A transition from the state (S5) 244 in which the car is waiting for a completed run is made, as indicated by a transition line 246 to state (S0) 226 upon the detection of a run command (event 74). An output funtion 011 from Table II, indicates an end of run by cancelling the motion state timer, run timer and deceleration timer, logging the synchronous position, and determining if this run is to be analyzed for run time and, if so, comparing the run time to a selected limit and, if greater than the limit, selecting maintenance message 6 from Table III for generation, i.e., that the run time between landings has been exceeded, the number of occurrences so far, the limit, the last failure time of occurrence, the first landing and the second landing.

The above described chain of events forms a closed loop chain of normal operating states uniquely associated with a run up mode of operation. Abnormal transitions out of the loop are of two kinds. The first type, into a dummy state (1) 248 which is merely presented in the drawing as an illustrative technique for not cluttering up the drawing with numerous crossed lines. The ultimate destination for states transitioning to dummy state (1) 248 is a state (S13) 250 which is an invalid sequence detected state.

The other possible transition path out of the chain to an abnormal state is via dummy state (2) 252 which is used similarly to that of dummy state (1) 248, as merely an illustrative technique. The true destination for transitions entering dummy state (2) 252 is state (S15) 222 which is indicative of a time out and that the elevator is stuck.

Transitions out of the loop to dummy state (1) 248 occur upon the detection of an error. Transitions to dummy state 2 occur upon the detection of the motion state timer enabled and timed out (event 47). Output function 002 from Table II indicates the elevator is not responding. The motion state timer is cancelled and a determination is made if a passenger is trapped within the car and shutdown message 12 or 13 is selected and a corresponding message generated. I.e., either "car not responding" or "trapped passenger car not responding" along with the committable land, the car at landing, the car stall protect, the monitoring state and the state of the safety chain. Transitions to dummy state (1) 248 from states S1, S2, S3, S4 corresponding, respectively, to states 228, 230, 234, 240 are indicated, respectively, by transition lines 254, 256, 258, 260. Similarly, transitions to dummy state (2) 252 from states S1, S2, S3, S4, S5, corresponding, respectively, to states 228, 230, 234, 240, 244, are indicated, respectively, by transition lines 262, 264, 266, 268, 270.

After a transition out of the normal chain to one of the two states 222, 250, a transition may be made back to state (S0) 226 upon the detection of a lack of a run command (event 74), a lack of a latched level up (event 57) a lack of a latched level down (event 59) and the emergency stop switch being off (event 86). A transition from state (S13) 250 to state (S0) 226 is indicated by a transition line 270 and is accompanied by an outout function 038 from Table II in which the motion state timer is cancelled. Similarly, a transition line 272 is indicative of a transition from state (S15) 222 to state (S0) 226 accompanied by an output function 003 from Table II indicative of the fact that a failed condition has been resolved. Shutdown message 6 is selected from Table III and generated indicating that the condition is resolved and back in service along with the committable landing, the car at landing indication, the car stall protect (an indication relating to a control algorithm that prevents hydraulic pumps from overheating), the monitoring state and the state of the safety chain state.

A down run loop made up of states S0, S6, S7, S8, S9, S10, correspond, respectively, to states 226, 280, 282, 284, 286, 288. The normal operating sequence and the transitions to abnormal states will not be discussed in detail as such details are almost identical to those previously explained in connection with the run up loop except for a reversal in the types of sensors which are monitored, taking into account the different direction of travel. The mnemonics and output functions are sufficiently detailed to permit the reader to consult the tables and readily determine the sequence without futher explanation.

With regard to both the run up and run down loops, the first state after the no motion state (S0) 226 in both loops is the run started state S1, S6 corresponding, respectively, to states 228, 280 and is capable of being transitioned out of itself and back into itself via transition paths 290, 292, in the case of state (S1) 228 and transition lines 294, 296 in the case of state (S6) 280. Transitions 290, 294 are similar and occur upon the detection of a change in the committable position by one floor. In such a case, output function 022 is selected from Table II indicative of a transition to a new motion state in which the "motion detected" flag is set. Transition lines 292, 296 are similar also and occur upon the detection of an up leveling inductor (event 64) which triggers an output function 039 in Table II, described as the detection of elevator motion, causing a setting of the "motion detected" flag.

A leveling up state (S11) 298 is transitioned to, as indicated by a transition line 300, from state (S0) 226. Such a transition is made upon a detection of a transition to a non-latched level up condition (event 57) accompanied by an output function 004 from Table II, in which it is indicated that a state of leveling exists by incrementing a leveling performance counter and enabling and initializing a motion state timer. This is a normal leveling operation state which is exited from, as indicated by a transition line 302, upon the detection of a latched level up condition (event 56) accompanied by an output function 038 in which the motion state timer is cancelled, indicating the leveling up operation is completed. If, while in the leveling up state (S11) 298, a door zone inductor changes state from off to on (event 68) a dummy "transition" will take place in which an output function 022 is generated from Table II indicating a transition to a new motion state in which the motion state timer is reset and the "motion detected" flag is set, but which results in no change of state, i.e., the "state machine" staying in state (S11) 298. The leveling up state (S11) 298 may be exited to abnormal dummy states 248, 252 in the same way as previously described in connection with the run up loop with the same messages sent.

The leveling up state (S11) 298 has a very similar counterpart in a leveling down state (S12) 306 which is transitioned to from state (S0) 226 and indicated by a transition line 308 and which occurs upon the detection of a transition to a latched level down condition (event 58) accompanied by an output function 004 from Table II indicative of a state of leveling in which the leveling performance counter is incremented and the motion state timer is enabled and initialized. State (S12) 306 is exited upon the detection of a transition to the absence of a latched level down condition (event 59), as indicated by a transition line 310 accompanied by an output function in which the motion state timer is cancelled. The leveling down state (S12) 306 may be exited to dummy states (1, 2) 248, 252 in the same manner as previously described in connection with the run up mode.

Similarly, an exit may be made from invalid sequence detected state (S13) 250 to dummy state (2) 252 in the same manner as previously described in connection with other states transitioning to dummy state (2) 252. There is also another possible transition out of state (S13) 250 a third dummy state 318 as indicated by a transition line 320 the dummy state (3) 318 transitions via a transition line 322 to non-normal mode state (S14) 220. This state may only be exited, as indicated by a transition line 324 to dummy state (1) 248 into state (S13) 250. However, state (S14) 220 may be entered as indicated by a transition line 326 upon detection of a transition to a non-normal mode (event 46) accompanied by an output function 009 in which the motion state timer, the front and rear door state timers and the delayed car timer are all stopped. The non-normal mode state (S14) 220 is obviously a holding state for non-normal mode conditions, e.g., for when a serviceman disables the system by entering a maintenance mode.

The POR sync state (S16) 224 is entered, as indicated by a transition line 328 upon the detection of a power on reset (event 0). The state is exited back to the no motion state (S0) 226 via a transition line 330 upon detection of a transition back to state zero when the system is in a known state with no motion commands and all doors closed.

Referring now to FIGS. 5(b) & 5(c) there will be found a motion sequence of events transition table (FIG. 5(c) is a continuation of FIG. 5(b)) which is the equivalent of FIG. 5(a) in tabular form. It has the same format as did FIG. 4(b) and will not be described in detail.

Referring now to FIG. 6(a), there is illustrated a static analysis sequence of event flow diagram. A normal start state (S0) 350 only exited to another distinct state (S1) 352 as indicated by a transition line 354 upon the detection of a transition to a DELAY state (event 70) accompanied by an output function 034 from Table II which indicates the start of a delayed car by enabling and starting the delayed car timer. As indicated by event 70 this occurs when both doors are fully closed but the hoistway doors are not. Dummy transitions may also be made out of but right back into state (S0) 350 as indicated by transition lines 356, 358, 360. A transition indicated by line 356 is triggered by the detection of a transition to an operator interrupt switch condition (event 73) accompanied by an output function 032 from Table II in which shutdown message 18 is selected and generated, i.e., "operator interrupt" as shown in Table with the identified data words provided as well. A dummy transition as indicated by transition line 358 occurs upon the detection of a high pit oil transition while in the normal start state accompanied by an output function 033 in which a maintenance request message 28 is selected from Table III and a corresponding message is generated, i.e., "high pit oil" with the number of occurrences so far. The last dummy transition occurs, as indicated by transition line 360, upon the detection of the absence of a power on reset.

A transition into the elevator delayed state (S1) 352 may be followed immediately by a return to the normal start state (S0) 350 as indicated by a transition line 362 which occurs upon the detection of event 71. There are two other possible transitions out of state (S1) 352, i.e., a transition indicated by transition line 364 to an abnormal car not responding state (S2) 366 or a transition as indicated by transition line 368 to an abnormal start state (S3) 370. A transition back to the normal start state (S0) 350 may be made from state (S2) 366 upon the detection of the DELAY function as defined by event 71 occurring as indicated by a transition line 372 and a transition from state (S3) 370 to state (S0) 350 is indicated by a transition line 374 and occurs upon the detection of a transition from the abnormal mode to the normal mode, i.e., if the serviceman switches out of a maintenance mode.

Abnormal start state (S3) 370 may also be entered from either state (S0) 350 or state (S2) 366 as indicated by transition lines 376, 378 both of which occur from the respective states upon the detection of a transition from a normal mode to a non-normal mode accompanied by an output function 009 which stops the motion state, the front and rear door state and the delayed car timers.

Each of the states (S1, S2, S3) corresponding, respectively, to state 352, 366, 370 have internal dummy transitions associated therewith similar to the dummy transitions 356, 358 already exolained in connection with normal start state (S0) 350.

Referring now to FIG. 6(b) there is shown a static analysis sequence of events table which presents the equivalent of FIG. 6(a) in tabular form, having a format already explained in connection with FIG. 4(b).

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Apparatus for monitoring an elevator, comprising:
   signal processor means, for monitoring the states of a plurality of two-state parameter signals, each indicative of one of a corresponding plurality of elevator parameters, said signal processor means determining the identity of an elevator operating state, for an elevator car, which normally operates sequentially from state to state in a closed loop sequential chain of linked normal operating states, by detecting the satisfaction of a transition criterion defining a transition from an immediately preceding operating state or an immediately succeeding operating state by detecting the parameter signal state or states, alone or in combination, of one or more sensed parameter signals defining the satisfied transition criterion, each criterion indicating either a transition to a normal operating state in the chain or to an abnormal operating state, and providing selected message signals in the presence of corresponding selected transitions; and
   an event buffer, responsive to a selected number of the latest to occur of selected parameter signal state changes, for storing signals indicative of said latest state changes, said event buffer responsive to said message signals for providing accompanying buffer message signals corresponding to the stored signals.

2. A method for monitoring an elevator car, comprising the steps of:
   monitoring the states of a plurality of two-state parameter signals, each indicative of one of a corresponding plurality of elevator parameters;
   determining the identity of a car door state, for an elevator car door which normally operates sequentially from state to state in a closed loop sequential chain of linked normal operating car door states, by detecting the satisfaction of a transition criterion defining a transition from an immediately preceding car door state or to an immediately succeeding car door state by detecting the parameter signal state or states, alone or in combination, of one or more sensed parameter signals defining the satisfied transition criterion, each criterion indicating either a transition to a normal car door state in the chain or to an abnormal car door state;
   determining the identity of a motion state of the elevator car, which normally executes movements sequentially from state to state in a closed loop sequential chain of linked normal operating motion states, by detecting the satisfaction of a transition criterion defining a transition from an immediately preceding motion state or to an immediately succeeding motion state by detecting the parameter signal state or states, alone or in combination, of one or more sensed parameter signals defining the satisfied transition criterion, each criterion indicating either a transition to a normal motion state in the chain or to an abnormal motion state; and providing selected message signals in response to the detection of corresponding selected transitions.

3. The method of claim 2, further comprising the steps of:
storing a selected number of the latest of selected parameter signal state changes to occur in an event buffer; and
providing said selected number of the latest parameter signal states as part of said selected message signals.

4. Apparatus for monitoring an elevator, comprising:
signal processor means, for monitoring the states of a plurality of two-state parameter signals, each indicative of one of a corresponding plurality of elevator parameters,
said signal processor means determining the identity of a car door state, for an elevator car door, which normally operates sequentially from state to state in a closed loop sequential chain of linked normal operating car door states, by detecting the satisfaction of a transition criterion defining a transition from an immediately preceding car door state or an immediately succeeding car door state by detecting the parameter signal state or states, alone or in combination, of one or more sensed parameter signals defining the satisfied transition criterion, each criterion indicating either a transition to a normal car door state in the chain or to an abnormal car door state, and providing selected car door message signals in the presence of corresponding selected transitions,
said signal processor means determining the identity of the motion state of the elevator car, which normally executes movements sequentially from state to state in a closed loop sequential chain of linked normal operating motion states, by detecting the satisfaction of a transition criterion defining a transition from an immediately preceding motion state or to an immediately succeeding motion state by detecting the parameter signal state or states, alone or in combination, of one or more sensed parameter signals defining the satisfied transition criterion, each criterion indicating either a transition to a normal motion state in the chain or to an abnormal motion state, and providing selected motion message signals in the presence of corresponding selected transitions; and
communication element means, responsive to message signals for transmission thereof.

5. The apparatus of claim 4, further comprising:
an event buffer, responsive to a selected number of the latest to occur of selected parameter signal state changes, for storing signals indicative of said latest state changes, said buffer responsive to said message signals for providing buffer message signals corresponding to the stored signals in response thereto.

* * * * *

UNITED STATES PATENT AND TRADEMARK OFFICE
CERTIFICATE OF CORRECTION

PATENT NO. : 4,750,591

DATED : 6/14/88

INVENTOR(S) : Steven D. Coste et al

It is certified that error appears in the above-identified patent and that said Letters Patent is hereby corrected as shown below:

| | |
|---|---|
| Column 2, line 29. | Cancel "execute" and substitute -- executes -- |
| Colum 10, line 4. | Cancel "messge" and substitute -- message -- |
| Column 10, line 9. | Cancel "monute" and substitute -- minute -- |
| Column 10, line 33. | Cancel "→" and substitute -- => -- |
| Column 10, line 37. | Cancel "→" and substitute -- => -- |
| Column 10, line 41 | Cancel "→" and substitute -- => -- |
| Column 11, line 53. | Cancel "limt" and substitute -- limit -- |

Signed and Sealed this

Seventh Day of February, 1989

*Attest:*

DONALD J. QUIGG

*Attesting Officer*      *Commissioner of Patents and Trademarks*